(12) United States Patent
Morris

(10) Patent No.: US 6,354,038 B1
(45) Date of Patent: Mar. 12, 2002

(54) GARDENING BARRIER

(76) Inventor: Bert W. Morris, 465 La Corso Cir., Walnut Creek, CA (US) 94598-2237

( * ) Notice: Subject to any disclaimer, the term of this patent is extended or adjusted under 35 U.S.C. 154(b) by 0 days.

(21) Appl. No.: 09/602,577

(22) Filed: Jun. 22, 2000

(51) Int. Cl.[7] ................................................. A01G 1/08
(52) U.S. Cl. ............................................................ 47/33
(58) Field of Search ................................. 47/33; 52/102

(56) References Cited

U.S. PATENT DOCUMENTS

| | | | |
|---|---|---|---|
| 1,414,593 A | * 5/1922 | Sklenka | 47/33 |
| 1,851,710 A | * 3/1932 | Lefevre | 47/33 |
| 2,877,600 A | * 3/1959 | Slate | 47/33 |
| 3,415,013 A | * 12/1968 | Galbraith | 47/33 |
| 3,951,294 A | * 4/1976 | Wilson | 47/33 |
| 4,644,685 A | * 2/1987 | Tisbo et al. | 47/33 |
| 5,465,526 A | * 11/1995 | Langley | 47/33 |
| 5,528,857 A | * 6/1996 | Ashleigh et al. | 47/78 |
| 5,584,602 A | * 12/1996 | Bevil | 405/36 |
| 5,720,128 A | * 2/1998 | Smith et al. | 47/33 |

FOREIGN PATENT DOCUMENTS

| | | | |
|---|---|---|---|
| DE | 2945292 | * 5/1981 | 47/33 |
| WO | 92/19096 | * 11/1992 | 47/33 |

* cited by examiner

*Primary Examiner*—Peter M. Poon
*Assistant Examiner*—Son T. Nguyen
(74) *Attorney, Agent, or Firm*—Jack Lo

(57) ABSTRACT

The present gardening barrier is comprised of an elongated flexible sheet and a connector at one end of the sheet. The sheet is adapted to be partially buried edgewise into the ground for separating two distinct horticultural areas. Depending on the application, the ends of sheet can be connected together to form a small cylinder or planting berm to collect water, or a plurality of sheets can be connected together to form a long border for separating a garden area from a lawn area. The lower edge of the sheet is provided with a row of teeth for marking the ground during installation. Elongated stakes are provided among the teeth for temporarily holding the sheet upright on the ground while trying different positions. Foldable insertion limitation tabs adjacent the top of the sheet may be folded out to ensure that the sheet is buried at an even depth along its entire length. Foldable retention tabs adjacent the bottom of the sheet may be folded out and buried underground to retain the sheet in the ground. The barrier is shipped with the tabs retracted, and the sheet coiled up in a tight compact roll.

14 Claims, 4 Drawing Sheets

GARDENING BARRIER

CROSS REFERENCE TO RELATED APPLICATION

I claim the benefit of a prior application with Ser. No. 09/063,631; filed Apr. 20 1998, now abandoned.

BACKGROUND OF THE INVENTION

1. Field of the Invention

This invention relates generally to gardening or landscaping borders.

2. Prior Art

Gardens are often planted next to lawns with clear demarcation lines between the soil in the gardens and the grass on the lawns. Therefore, there is a need to prevent garden soil from spilling onto the grass area, and a need to prevent grass from growing in the garden areas. A common way of separating those areas is with a border. A conventional border is comprised of a long rectangular sheet of flexible plastic or rubber. It is typically rolled up tightly for compact shipping and storage. It is pounded edgewise into the soil along a straight or curving path until it is partially buried. The above ground portion is thus arranged to function as a barrier between two distinct horticultural areas. It can also be used for encircling areas which are covered with redwood chips by connecting additional sheets into a continuous loop.

A border should be inserted just the right depth into the ground for enough support, but still project high enough above ground to be an effective barrier. In practice, it is difficult to insert the border at exactly the same depth along its entire length. Borders are thus frequently installed with high and low sections, which make them less effective and less attractive. Another problem with installing the border is the difficulty in fine tuning the position of the border before inserting it fully into the ground. Being just a flat sheet, the border cannot stand up on the ground for judging its position without inserting it substantially into the ground. Also, it has a straight lower edge that cannot be used to easily mark its position on the ground. After they are installed, they are sometimes caused to rise up by ground pressure. They also tend to come loose when knocked about by people or gardening equipment.

Many variations to the basic rectangular sheet border are known in the prior art. A border disclosed in U.S. Pat. No. 2,184,904 to Boehme is comprised of a sheet formed into a cylinder. A flange is arranged around the outside of the cylinder to limit the insertion depth. However, the flange and the cylinder must be assembled by the user. If the flange is provided as an integral or otherwise permanently attached part, the border cannot be rolled up tightly for compact shipping.

Another border disclosed in U.S. Pat. No. 5,465,526 to Langley is comprised of a cylinder formed by joining the ends of a sheet with a connector. The bottom edge of the sheet is provided with a row of teeth for facilitating insertion into the ground. The teeth are shallow and all of the same size. If the border is uncurled and used as a straight border, the teeth are too shallow to dig into the ground for temporary positioning when trying different paths. The connector is comprised of a T-shaped male key at one end of the sheet and a T-shaped female slot at the other end. Gardening borders are frequently cut to different lengths to suit the application, but if the border of Langley is cut, one of the connectors will be cut off and the ends cannot be connected together anymore.

OBJECTIVES OF THE INVENTION

Accordingly, the objectives of the present gardening barrier are: to separate two distinct horticultural areas; to be connectable in different configurations for different applications; to be connectable to itself or other barriers even after it is trimmed to a shorter length; to prevent plants or materials in either area from crossing over to the other; to help ensure that it is inserted to the same depth into the ground along its entire length; to be secure in the ground; to be able to stand up temporarily for initial positioning during installation; to be able to mark its position on the ground when judging its placement; and to be able to be rolled up tightly for shipping or storage.

Further objectives of the present invention will become apparent from a consideration of the drawings and ensuing description.

BRIEF SUMMARY OF THE INVENTION

The present gardening barrier is comprised of an elongated flexible sheet and a connector at one end of the sheet. The sheet is adapted to be partially buried edgewise into the ground for separating two distinct horticultural areas. Depending on the application, the ends of sheet can be connected together to form a small cylinder or planting berm to collect water, or a plurality of sheets can be connected together to form a long border for separating a garden area from a lawn area. The lower edge of the sheet is provided with a row of teeth for marking the ground during installation. Elongated stakes are provided among the teeth for temporarily holding the sheet upright on the ground while trying different positions. Foldable insertion limitation tabs adjacent the top of the sheet may be folded out to ensure that the sheet is buried at an even depth along its entire length. Foldable retention tabs adjacent the bottom of the sheet may be folded out and buried underground to retain the sheet in the ground. The barrier is shipped with the tabs retracted, and the sheet coiled up in a tight compact roll.

DRAWING REFERENCE NUMERALS

| | |
|---|---|
| 10. Sheet | 11. Connector |
| 12. Top Edge | 13. Bottom Edge |
| 14. End | 15. End |
| 16. Double Clip | 17. Arms |
| 18. Cross Member | 19. Double Clip |
| 21. Arms | 22. Cross Member |
| 23. Single Clip | 24. Arms |
| 25. Single Clip | 26. Arms |
| 27. Teeth | 28. Stake |
| 29. Insertion Limitation Tab | 30. Tab Stop |
| 31. Retention Tab | 32. Tab Stop |
| 33. Retention Tab | 34. Tab Stop |
| 35. Tab Stop | 36. Tab |
| 37. Hooks | 38. Tab Stop |
| 39. Tab | 40. Key |
| 41. Slot | 42. Sleeve |
| 43. Holes | |

DETAILED DESCRIPTION OF THE INVENTION

FIGS. 1–4

Figure 1:
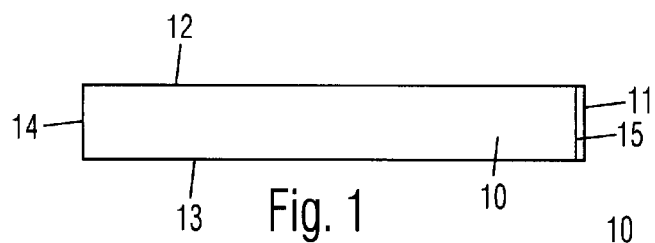
FIG. 1 is a side view of the present gardening barrier.

A preferred embodiment of the present gardening barrier is shown in a side view in FIG. 1. The present gardening barrier is comprised of an elongated flexible sheet 10 and a connector 11 at one end of the sheet. Sheet 10 has a top edge 12, a bottom edge 13, and opposite ends 14 and 15. Sheet 10 is for being partially buried edgewise into the ground for separating two distinct horticultural areas. It is preferably made of flexible plastic or rubber for being bendable into different shapes, and for being waterproof and rustproof.

Figure 2:
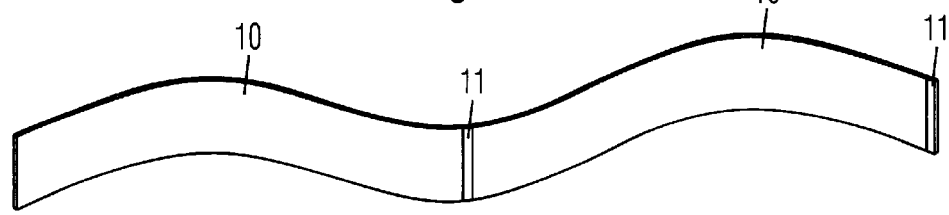
FIG. 2 is a side perspective view of two barriers connected to form a curving border.
Figure 3:
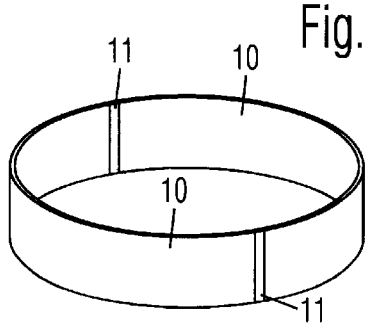
FIG. 3 is a side perspective view of two barriers connected to form a loop border.
Figure 4:
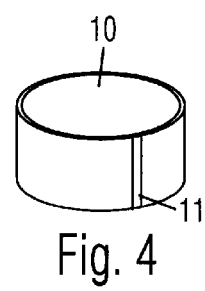
FIG. 4 is a side perspective view of the barrier coiled to form a cylindrical berm.

One or more sheets 10 can be connected in different configurations for different applications. In FIG. 2, a plurality of sheets 10 are connected together to form a long border for separating two large areas, such as a planted garden area and a grassy lawn area. In FIG. 3, two sheets 10 are connected together in a loop for encircling a small planted garden area in the middle of a lawn. In FIG. 4, the ends of a single sheet 10 are connected together to form a small cylinder or planting berm for a single or small group of plants. The berm is for collecting water around the roots, and also for preventing erosion. Many other configurations and uses are possible.

FIGS. 5–8

Figure 5:
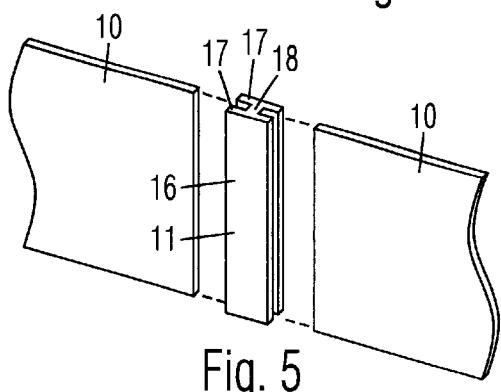
FIG. 5 is a side perspective view a first embodiment of a connector of the barrier.

Different embodiments of connector 11 are shown in FIGS. 5–8. In FIG. 5, it is comprised of a double clip 16 with two straight and parallel arms 17 connected by a central cross member 18 in a "H" shape. Arms 17 are spaced from each other just enough to tightly receive an end of sheet 10. Double clip 16 is separate from sheet 10, and is used for connecting two sheets 10 together end-to-end, or connecting both ends of the same sheet. The advantage is that even if both ends of sheet 10 are trimmed, double clip 16 can still be connected to sheet 10. A double clip 19 shown in FIG. 6 includes especially elongated arms 21 which are connected by a central cross member 22. Arms 21 are long enough to prevent the sheets from separating when the barrier is subjected to movement, such as during installation.

Figure 7:
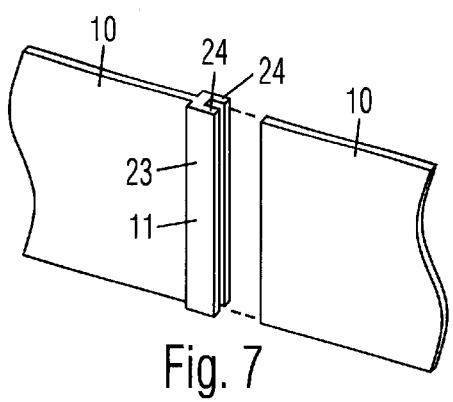
FIG. 7 is a side perspective view of a third embodiment of the connector.
Figure 6:
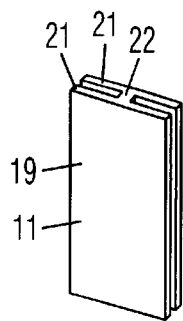
FIG. 6 is a side perspective view of a second embodiment of the connector.
Figure 8:
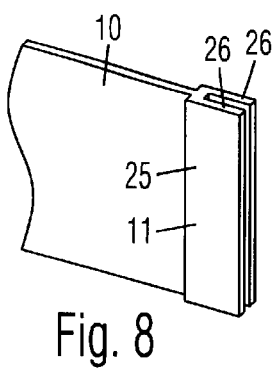
FIG. 8 is a side perspective view of a fourth embodiment of the connector.

In FIG. 7, another embodiment of connector 11 is shown as a single clip 23 integrally attached to one end of sheet 10. It is comprised of two straight and parallel arms 24 attached to opposite sides of sheet 10. Arms 24 are spaced apart just enough to tightly receive one end of another sheet, or the other end of the same sheet. A single clip 25 shown in FIG. 8 includes especially elongated arms 26 that help prevent the sheets from separating when they are subjected to movements during installation.

FIG. 9

Figure 9:
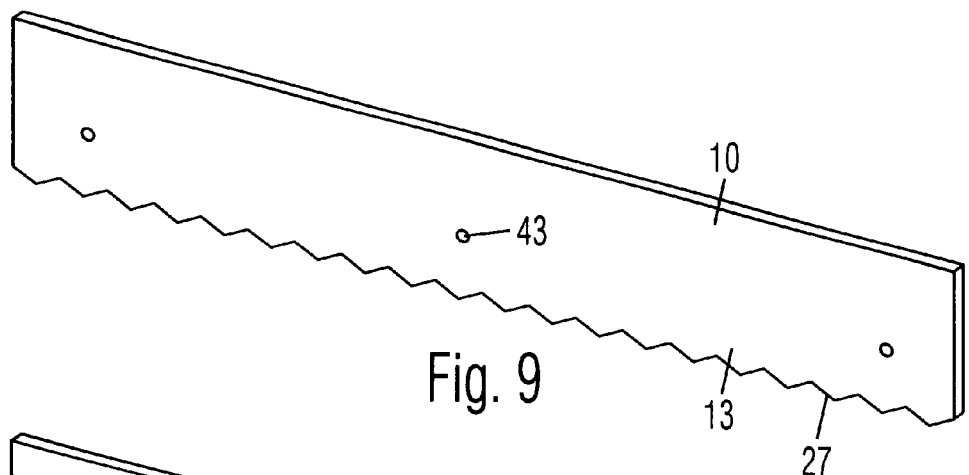
FIG. 9 is a side perspective view of the border showing a row of teeth at the bottom edge.

The barrier may be provided with a row of teeth 27 at bottom edge 13 of sheet 10, as shown in FIG. 9. Sheet 10 can be used to mark its path during installation by pressing teeth 27 into the ground. Sheet 10 can thus be removed from the area without losing track of the selected path. Further gardening operations, such as digging, can also be carried out with the mark as a guide. Holes 43 are provided along sheet 10 for receiving stakes.

FIGS. 10–12

Figure 10:
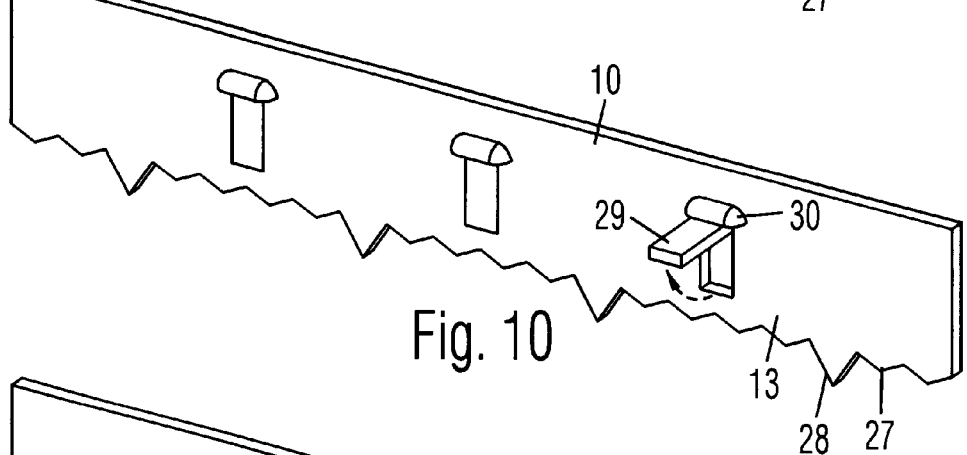
FIG. 10 is a side perspective view of the border showing spikes among the teeth, and foldable insertion limitation tabs.
Figure 11:
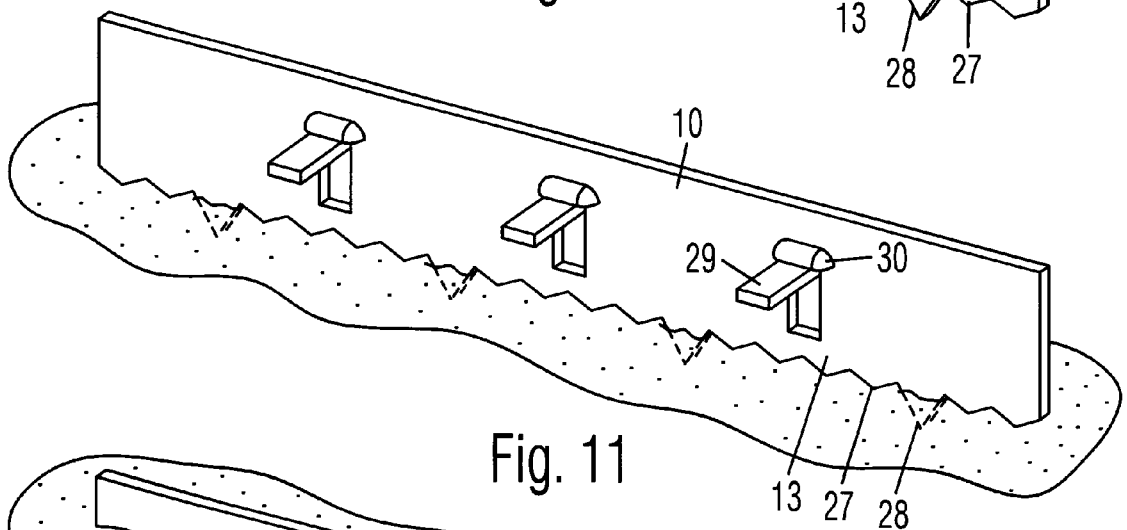
FIG. 11 is a side perspective view of the border of FIG. 10 temporarily inserted into the ground during installation.

As shown in FIG. 10, elongated stakes 28 may be provided along bottom edge 13 of sheet 10, which may be with or without teeth 27. As shown in FIG. 11, stakes 28 are for being inserted into the ground to temporarily hold sheet 10 upright without inserting bottom edge 13. This is useful when trying different positions for the barrier. There should not be too many stakes. If there are so many stakes that they are in touching contact with each other, there will be too many to allow them to be easily inserted into the ground. Stakes 28 are thus spaced away from each to reduce their number. The fewer the stakes, the easier it is to insert them into the ground, but there has to be enough to hold sheet 10 upright. There are preferably at least two stakes per sheet.

Figure 12:
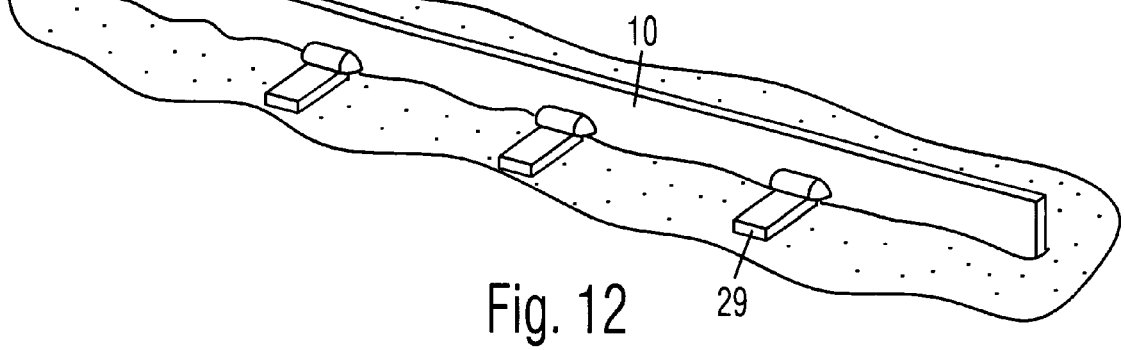
FIG. 12 is a side perspective view of the border of FIG. 10 fully inserted into the ground.

The barrier may also be provided with foldable insertion limitation tabs 29 along sheet 10, as shown in FIG. 10. Each tab 29 is hinged at one end about a longitudinal axis of sheet 10. Tab 29 is preferably hinged at its top end, such as with a living hinge, so that it is closer to the top edge of sheet 10 when folded out to allow more of sheet 10 to be buried for stability. A stop 30 is provided adjacent the hinged end of each tab 29 to limit its rotation, preferably to about 90 degrees. Tab stop 30 may be provided on the side of sheet 10, or on tab 29. One tab is shown folded out. When tabs 29 are folded out, they limit sheet 10 to a predetermined insertion depth to ensure that sheet 10 is buried evenly along its entire length, as shown in FIG. 12. Alternatively, more than one row of tabs 29 may be provided at different heights on sheet 10 for limiting insertion to different depths. Tabs 29 may be left retracted if they are not needed, so that they will not interfere with insertion. Tabs 29 are retracted when the barrier is made, so that sheet 10 can be rolled into a tight coil for shipping.

FIGS. 13–15

Figure 13:
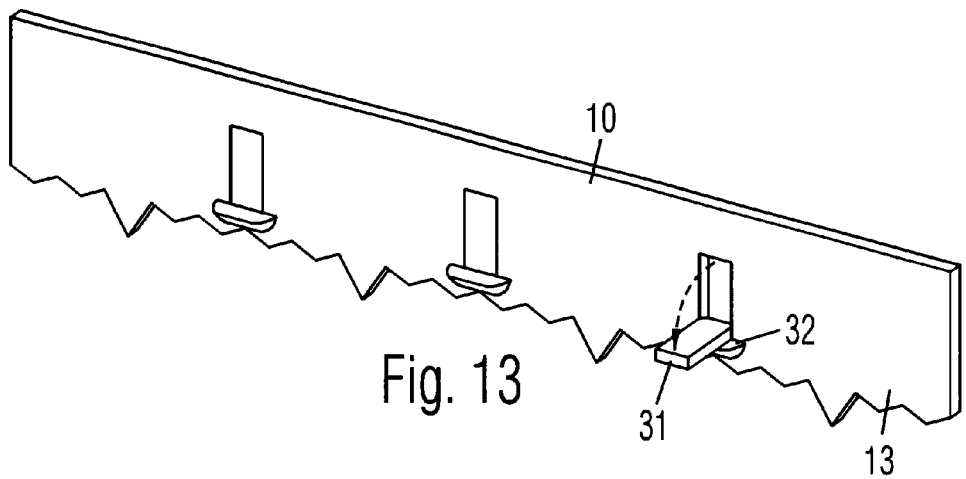
FIG. 13 is a side perspective view of the border with a first embodiment of foldable retention tabs.
Figure 14:
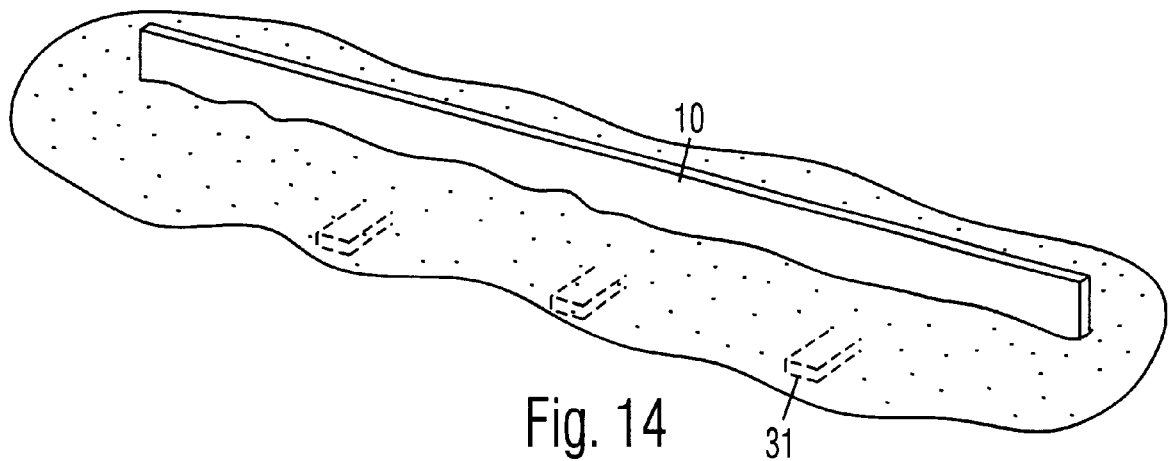
FIG. 14 is a side perspective view of the border of FIG. 13 retained in the ground.

As shown in FIG. 13, foldable retention tabs 31 may be provide along sheet 10. Tabs 31 are preferably hinged at their bottom ends along a longitudinal axis of sheet 10. A stop 32 is provided adjacent the hinged end of each tab 31 to limit its rotation, preferably to about 90 degrees. Tab stop 32 may be provided on the side of sheet 10, or on tab 31. One tab 31 is shown folded out. When folded out, tabs 31 are closer to bottom edge 13 of sheet 10 for being buried deep in the ground. To install, a hole is dug in the ground, sheet 10 is positioned in the hole, and tabs 31 are folded out into the soil. When the hole is refilled, sheet 10 is firmly retained in the ground by tabs 31, as shown in FIG. 14. The barrier is shipped with tabs 31 retracted, so that sheet 10 can be rolled into a tight coil for shipping.

Figure 15:
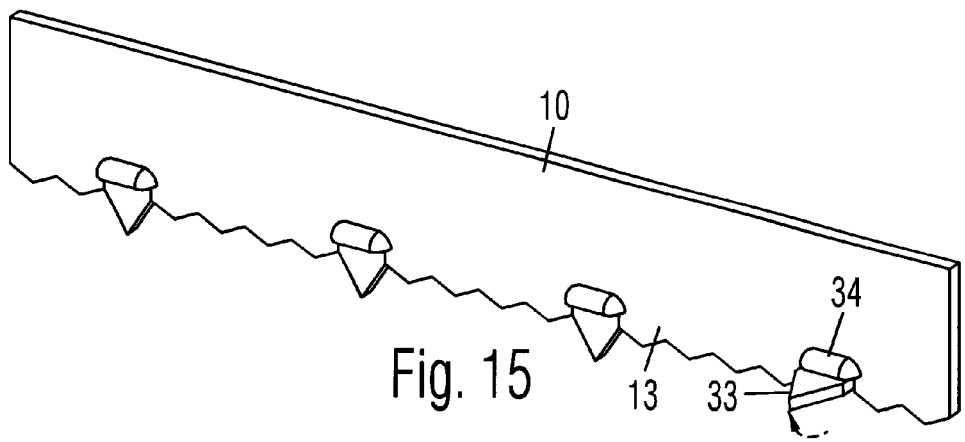
FIG. 15 is a side perspective view of the border with a second embodiment of the retention tabs.

Alternative foldable retention tabs 33 are shown in FIG. 15. They are hinged at their top ends for being folded up. A tab stop 34 is provided adjacent the hinged end of each tab 33 to limit its rotation, preferably to about 90 degrees. Tabs 33 are shaped as stakes in this example. Alternatively, they may be have blunted bottom ends that are flush with bottom edge 13 of sheet 10.

Retention tabs 31 or 33 may also act as insertion limitation tabs after they are folded out and inserted into the surrounding soil.

FIGS. 16–19

Figure 16:
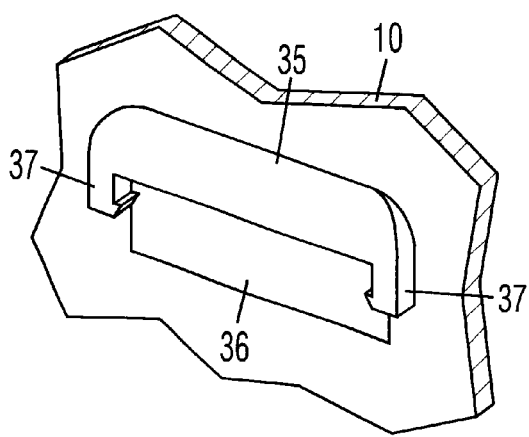
FIG. 16 is a side perspective view of a first embodiment of a tap stop with the tab in a retracted position.
Figure 17:
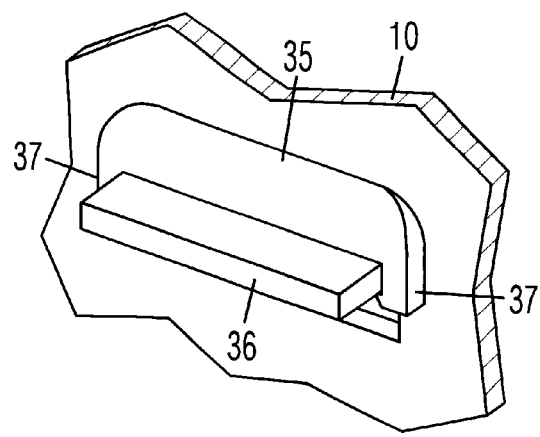
FIG. 17 is the tab of FIG. 16 folded out.

A second tab stop 35 is shown in FIG. 16. It is attached to a side of sheet 10 adjacent a hinged end of a tab 36, which may be an insertion limitation tab or a retention tab. The bottom surface of tab stop 35 is generally orthogonal to the surface of sheet 10. A pair of inwardly directed hooks 37 depend from the ends of tab stop 35. In FIG. 17, tab 36 is folded out and locked in position by hooks 37.

Figure 18:
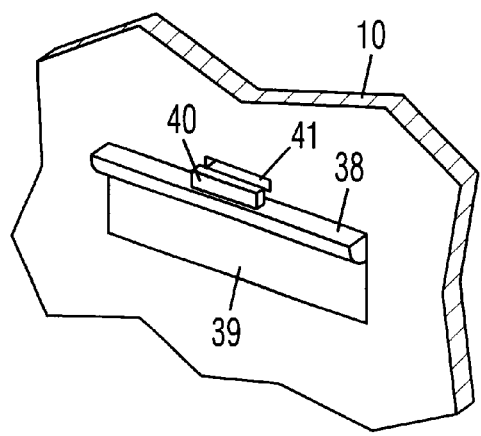
FIG. 18 is a side perspective view of a second embodiment of the tap stop with the tab in a retracted position.
Figure 19:
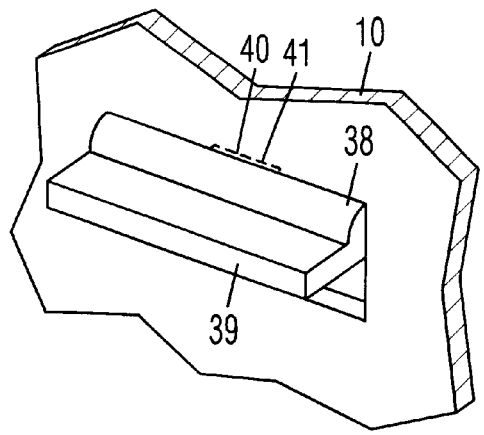
FIG. 19 is the tab of FIG. 18 folded out.

A third tab stop 38 is shown in FIG. 18. It is attached across a hinged end of a tab 39 and movable therewith. Tab 39, which may be an insertion limitation tab or a retention tab, is hinged at the end adjacent tab stop 38. When tab 39 is retracted, the upper surface of tab stop 38 is generally orthogonal to sheet 10. When tab 39 is folded out, as shown in FIG. 19, a key 40 projecting from the upper surface of tab stop 38 is secured in a slot 41 on the side of sheet 10 to retain tab 39 in position.

Either tab 36 or may be hinged at the upper or lower end for respectively folding up or down.

FIG. 20

Figure 20:
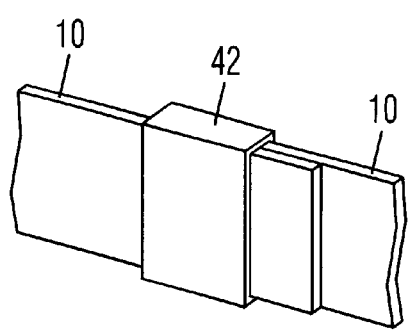
FIG. 20 is a fifth embodiment of the connector.

A fifth embodiment of the connector is shown in FIG. 20. It is comprised of a tubular sleeve 42 attached to one end of a sheet 10. A second sheet is connected to first sheet 10 by passing one end of second sheet 10' through sleeve 42. Alternatively, the same sheet can be arranged in a loop to form a planting berm. Sleeve 42 may be open at both ends to allow second sheet 10' to pass through, or it may be closed at one end. Sleeve 42 may be permanently attached to first sheet 10, or it may be detachable.

SUMMARY AND SCOPE

Accordingly, the present gardening barrier separates two distinct horticultural areas. It is connectable in different configurations for different applications. It is connectable to itself or other barriers even after it is trimmed to a shorter length. It prevents plants or materials in either area from crossing over to the other. It helps ensure that it is inserted to the same depth into the ground along its entire length. It prevents itself from rising up from the ground or bumped loose. It is able to easily stand up temporarily for initial positioning during installation. It is able to mark its position on the ground when judging its placement. It is also able to be rolled up tightly for shipping or storage.

Although the above description is specific, it should not be considered as a limitation on the scope of the invention, but only as an example of the preferred embodiment. Many variations are possible within the teachings of the invention. For example, different attachment methods, fasteners, materials, dimensions, etc. can be used unless specifically indicated otherwise. The relative positions of the elements can vary, and the shapes of the elements can vary. The barrier may be provided with any combination of the individually disclosed features. Therefore, the scope of the invention should be determined by the appended claims and their legal equivalents, not by the examples given.

I claim:

1. A gardening barrier, comprising:
   an elongated continuous flexible sheet with a top edge, a bottom edge, and opposite ends, wherein said sheet is adapted to be partially buried edgewise into the ground for separating two distinct horticultural areas;
   foldable tabs arranged along said sheet, wherein each of said tabs is hinged at one end with a living hinge about a longitudinal axis of said sheet, said tabs are movable between a retracted position parallel to said sheet and an extended position folded out from said sheet; wherein
   when said tabs are retracted against said sheet, said sheet can be coiled into a tight roll for shipping;
   when said tabs are folded out and positioned above the ground, said tabs are adapted to limit an insertion depth of said sheet into the ground; and
   when said tabs are folded out and positioned below the ground, said tabs are adapted to grip the ground and retain said sheet in the ground, wherein each of said tabs is hinged at a top end thereof, and further including a tab stop provided adjacent said hinge of each of said tabs to limit rotation of each of said tabs.

2. The gardening barrier of claim 1, further including a row of teeth arranged along said bottom edge of said sheet for marking a path on the ground during installation, so that said sheet is removable from the ground without losing track of said path.

3. The gardening barrier of claim 1, further including a plurality of stakes arranged along said bottom edge of said sheet for being inserted into the ground to temporarily hold said sheet upright without inserting said bottom edge of said sheet into the ground, wherein said stakes are spaced apart from each other to reduce the number of said stakes and enable said stakes to be more easily inserted into the ground.

4. The gardening barrier of claim 1, wherein said sheet is made of flexible plastic or rubber for being bent into different shapes.

5. The gardening barrier of claim 1, wherein each of said tabs is hinged at a top end thereof for being folded up closer to said top edge of said sheet and thus enable more of said sheet to be buried for stability.

6. The gardening barrier of claim 1, wherein each of said tabs is hinged at a bottom end thereof for being folded down closer to said bottom edge of said sheet and thus be buried deeper into the ground for security.

7. The gardening barrier of claim 1, wherein said tab stop is attached to a side of said sheet adjacent said hinge of each of said tabs, and a pair of inwardly directed hooks depending from opposite ends of said tab stop, wherein a bottom surface of said tab stop is generally orthogonal to said sheet, and when said tab is folded out, said tab is locked in an extended position by said hooks.

8. The gardening barrier of claim 1, wherein said tab stop is attached to said tab adjacent said hinge and movable with said tab, a key projecting from an upper surface of said tap stop, and a slot in said sheet adjacent said key, wherein when tab is retracted, said upper surface of said tab stop is generally orthogonal to said sheet, and when said tab is folded out, said key is secured in said slot in said sheet to retain said tab in position.

9. The gardening barrier of claim 1, wherein said tabs are elongated and pointed at lower ends thereof to project below said bottom edge of said sheet for staking into the ground for temporarily positioning said sheet on the ground.

10. The gardening barrier of claim 1, further including a connector fixedly connected to only one of said ends of said sheet for connecting to another sheet, another one of said ends of said sheet is connector-free for being reducible by trimming.

11. The gardening barrier of claim 1, further including a connector comprised of a double clip with one end detachably connected to one of said ends of said sheet, said double clip has another end for connecting to another sheet, said double clip is comprised of two straight and parallel arms connected at by a central cross member in an "H" shape, said arms are spaced from each other just enough to tightly receive one of said ends of said sheet, said double clip is separate from said sheet, so that when both ends of said sheet are trimmed, said double clip can still be attached to either end of said sheet.

12. The gardening barrier of claim 1, further including a connector comprised of a single clip at one of said ends of said sheet for connecting to another sheet, said single clip is comprised of two straight and parallel arms connected to opposite sides of said sheet and projecting from one of said ends of said sheet, said arms are spaced from each other just enough to tightly receive said another sheet.

13. The gardening barrier of claim 1, further including a connector comprised of a tubular sleeve attached to one end of said sheet for receiving an end of another sheet.

14. The gardening barrier of claim 1, further including holes along said sheet for receiving stakes.

* * * * *